No. 699,693. Patented May 13, 1902.
C. C. LONGARD.
PIPE WRENCH.
(Application filed Sept. 21, 1901.)
(No Model.)
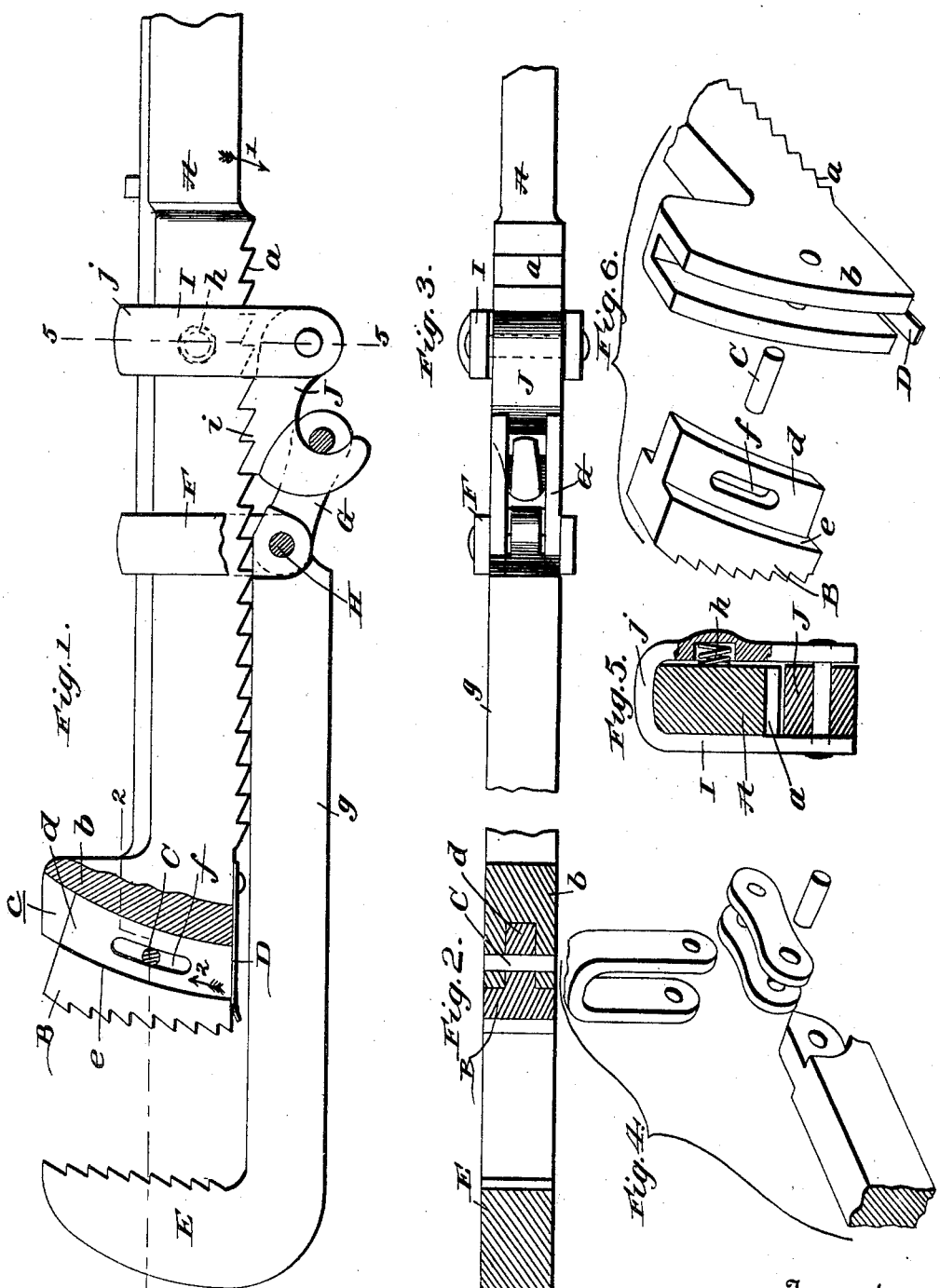
Witnesses
Inventor
C. C. Longard
By James J. Sheehy
Attorney

UNITED STATES PATENT OFFICE.

CLARENCE C. LONGARD, OF HALIFAX, CANADA.

PIPE-WRENCH.

SPECIFICATION forming part of Letters Patent No. 699,693, dated May 13, 1902.

Application filed September 21, 1901. Serial No. 76,094. (No model.)

*To all whom it may concern:*

Be it known that I, CLARENCE C. LONGARD, a citizen of Canada, residing at Halifax, in the Province of Nova Scotia and Dominion of Canada, have invented new and useful Improvements in Pipe-Wrenches, of which the following is a specification.

My invention relates to improvements in pipe-wrenches, and contemplates the provision of a pipe-wrench which while simple and inexpensive in construction is susceptible of quick adjustment and application to a pipe and is highly reliable in operation.

With the foregoing in mind the invention will be fully understood from the following description and claims when taken in conjunction with the accompanying drawings, in which—

Figure 1 is a broken side elevation of my improved wrench with some of the parts in section. Fig. 2 is a detail section taken in the plane indicated by the line 2 2 of Fig. 1. Fig. 3 is a detail inverted plan view illustrative of the connection between the two slides on the handle. Fig. 4 comprises disconnected perspective views of the rear end of the adjustable pipe-engaging member and the devices for connecting it to the handle and the holding link or hook. Fig. 5 is a transverse section taken in the plane indicated by line 5 5 of Fig. 1; and Fig. 6 comprises disconnected perspective views of the head at the forward end of the handle and the toothed gripper, which, in conjunction with said head, constitutes the inner pipe-engaging member or jaw of the wrench.

Referring by letter to the said drawings, A is the wrench-handle, toothed at one edge, as indicated by $a$, and equipped at its forward end with a head $b$, having a convex face and a kerf or groove $c$ therein.

B is a toothed gripper having a reduced portion or shank $d$ arranged in the groove of the head and concave shoulders $e$, bearing against the face thereof.

C is a transverse pin secured in the head and extending through a slot $f$ in the shank of the gripper, and D is a flat spring connected to that side of the handle which is toothed and bearing against one end of the gripper.

The convex face of the head $b$ and the shoulders $e$ of the gripper B are slightly in- clined toward the right, and the gripper is of the shape shown. From this it follows that when the handle A is moved in the direction indicated by arrow 1 to turn a pipe held between the jaws or pipe-engaging members the head $b$ will be moved in the direction indicated by arrow 2 with respect to the gripper, and in consequence the gripper will be wedged against the head and pipe and enabled to take secure hold of the latter. This wedging of the gripper is against the action of the spring D, and hence when the handle is moved in the direction opposite to that indicated by arrow 1 to take a fresh hold on the pipe the spring will operate to quickly return the gripper to the position shown, ready to be again wedged between the head $b$ and pipe.

E is the outer jaw or pipe-engaging member of the wrench, which is toothed, as shown, and has a shank $g$ disposed parallel to the handle.

F is a U-shaped slide arranged on the handle; G, a connection, shown as a link; H, a pin pivotally connecting the inner reduced end of the shank $g$ to the slide and link.

I is a slide mounted on the handle and extending beyond the toothed side thereof and provided with a spring $h$, designed to bear against the handle and prevent a too-free movement of the slide thereon, and J is a link, preferably in the form of a hook, arranged between and pivotally connected to the extended sides of slide I and having the forward portion of its side adjacent to the edge of the handle bearing the teeth $a$ equipped with complementary teeth $i$.

In applying my improved wrench to a pipe the user moves the slides I and F toward the right on the handle, and thereby draws the outer jaw E toward the inner jaw until the pipe is snugly held between the same. Incident to such movement of the slides I and F the hook J by virtue of its pivotal connection to the slide I and its loose connection with slide F will ride freely over the teeth of the handle and not interfere with the movement; but when the handle is moved in the direction indicated by arrow 1 to grip the pipe between the outer and inner jaws or engaging members and cause it to turn the slide F will be drawn forward on the handle and the toothed side of the hook J will be drawn into engagement with the teeth of the handle, as shown in Fig. 1, and in consequence the handle will be snugly held between said toothed side of the hook and the transverse portion *j* of the slide I and said slide will be held against rocking on the handle, with the result that slipping of the hook or slide so long as force is applied to the handle in the direction stated will be precluded, which is an important desideratum. The slide F serves to hold the shank of the jaw E to the handle A without in any way interfering with or rendering difficult the adjustment of said jaw E with respect to the inner jaw.

It will be readily appreciated from the foregoing that my improved wrench is at once susceptible of quick adjustment and application to a pipe, reliable in operation, and simple and strong in construction.

Having described my invention, what I claim, and desire to secure by Letters Patent, is—

1. In a pipe-wrench, the combination of a handle toothed at one edge and having a pipe-engaging member or jaw at its end, forward and rear slides mounted on the handle, a second pipe-engaging member pivotally connected at the rear end of its shank to the forward slide, a link pivotally connected to said shank and the forward slide, and extending rearwardly therefrom, and a hook engaged with the link and pivotally connected to the rear slide and having its edge or side adjacent to the toothed edge of the handle correspondingly toothed.

2. In a pipe-wrench, the combination of a handle toothed at one edge, a head at the end of the handle having the convex inclined face, and the groove therein, a gripper having a reduced portion secured and adapted to move in the groove of the head, and also having shoulders curved and inclined in conformity to the face of the head, a slide mounted on the handle and extended beyond the toothed edge thereof, and having the transverse portion arranged to engage the edge of the handle opposite to the toothed edge, a link pivotally connected to the extended portion of the slide and extending forwardly therefrom, and having the side of its forward portion adjacent to the toothed edge of the handle toothed, a jaw having a shank disposed at the side of the handle, a slide straddling the handle and connected to said shank, and a connection between the shank and the pivoted and toothed link.

In testimony whereof I have hereunto set my hand in presence of two subscribing witnesses.

CLARENCE C. LONGARD.

Witnesses:
C. PAETZOLD,
ARTHUR WOODBURY.